United States Patent Office 2,886,792
Patented May 12, 1959

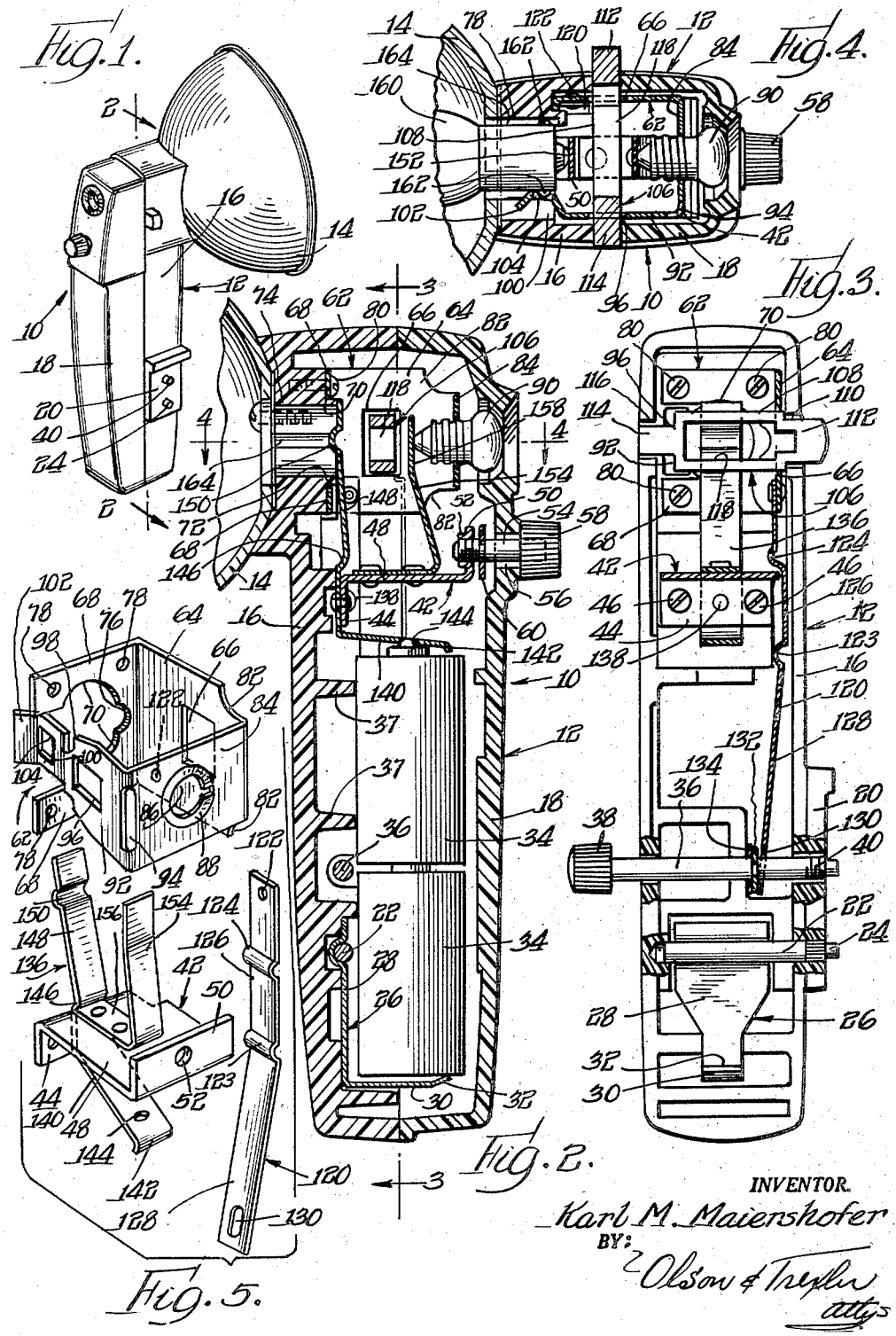

2,886,792

FLASH UNIT

Karl M. Maiershofer, Norridge, Ill., assignor to G-M Laboratories Inc., Chicago, Ill., a corporation of Illinois Application February 27, 1956, Serial No. 567,853

8 Claims. (Cl. 339—45)

This invention is concerned generally with the photographic arts, and more specifically with an improved flash gun or flash unit.

Most cameras now manufactured, even those of the inexpensive type, are provided with shutters having flash synchronization so that pictures can be made by the use of the more or less instantaneous flash of light from a flash bulb. Immediately after the "burning" of a flash bulb the bulb is quite hot. Many times it is not convenient or it is not desirable to leave a bulb in the flash unit long enough for it to cool. On the other hand, the photographer is likely to burn his fingers if manual removal of the hot bulb is necessary. Therefore, many types of ejection devices for burned flash bulbs have been developed. Many of these have been relatively complicated, and hence unduly expensive.

The dry batteries used in portable flash units lose their potency with age, regardless of whether or not they are used. Thus, if a flash unit has not been used for some time, and the batteries therefore have become run down, or if the batteries have been run down by use, the batteries may be incapable of igniting the flash bulb, or at least may ignite the bulb too slowly for proper synchronization. Obviously, it is not desirable to replace batteries when they may still have a considerable useful life. On the other hand, it is equally undesirable to attempt to take a picture and have the flash bulb fail to ignite. The intended photograph often is of such nature that it cannot be repeated, and in any event there often is enough light present to form an image of sorts on the film, thus wasting an exposure. The same results sometimes will occur due to defective flash contacts in a camera. Accordingly, various expedients have been adopted for testing batteries. Often, this has necessitated an external device. Other times, a testing device has been incorporated in the flash unit, but has required extra parts materially increasing the cost of fabricating the unit.

It is an object of this invention to provide a flash unit having an improved bulb retainer for effecting automatic ejection of a used bulb.

A further object of this invention is to provide an improved structure for mounting a test light for ascertaining the condition of the batteries in a flash unit and the operability of the flash contacts in the camera.

More specifically, it is an object of this invention to provide a common device for retaining flash bulbs and effecting automatic ejection thereof, and for mounting a test bulb or light.

Other and further objects and advantages of the present invention will be apparent from the following description when taken in connection with the accompanying drawings wherein:

Fig. 1 is a perspective view of a flash unit embodying the principles of the invention;

Fig. 2 is a longitudinal sectional view through the flash unit as taken substantially along the line 2—2 in Fig. 1;

Fig. 3 is a longitudinal sectional view taken at right angles to Fig. 2 and substantially along the line 3—3 therein;

Fig. 4 is a cross sectional view as taken along the line 4—4 in Fig. 2; and

Fig. 5 is an exploded perspective view of certain of the conductive parts of the flash unit.

Referring now in greater particularity to the drawings, there will be seen a flash unit generally designated by the numeral 10 and comprising a molded plastic housing 12 having a reflector 14 secured thereto in any desirable manner, such as by screws passing through the reflector and threaded into the housing 12. The housing comprises a front body part 16, and a rear body part 18 meeting generally along the median plane of the housing and held together in a manner hereinafter to be set forth.

The front body part 16 of the housing is provided with an integral portion 20 complementary to the side of a camera for fitting firmly thereagainst. A pin 22 extends transversely through the front body portion and has a reduced outer end 24 adapted to engage in an electrical contact in the camera body. The projecting end 24 of the pin 22 thus forms one electrical connection, and also serves to position the flash unit relative to the camera. The pin 22 also serves to trap an L-shaped contact piece 26 in place within the housing. The contact piece includes a body 28 engaging the pin 22, and a generally right angularly disposed foot 30 having an upturned tip 32 thereon adapted to engage the zinc casing forming the negative terminal of the lowermost of a pair of dry batteries 34, the dry batteries being positioned within the housing by suitable transverse and bevel ribs such as 37.

A stud 36 having a knurled plastic knob 38 projecting outwardly from one side of the housing passes through the housing and is provided at its opposite extremity with a threaded end 40. This threaded end is adapted to be received in a threaded flash contact in the camera body, and serves to form the second separable electrical connection. In addition, the stud 36 serves to bolt or screw the flash unit detachably on the side of the camera.

A generally Z-shaped bracket 42 is mounted within the housing relatively toward the upper end thereof. This bracket includes a flange 44 secured to the front body portion 16 of the housing 12 by means such as a pair of screws 46. The bracket further includes a web 48 and at the opposite edge of the web there is provided a flange 50 oriented oppositely of the flange 44. The flange 50 is provided with a threaded, central aperture 52, and the material of the flange is extruded around the aperture so that more threads can be formed therein. A machine screw 54 projects through an opening 56 in the back or rear portion 18 of the housing, and is threadedly received in the aperture 52. The screw 54 is provided on the outer end thereof with a knurled plastic knob 58 for convenient manipulation by the fingers. A C-washer 60 fits in a groove in the screw 54 internally of the housing to secure the screw against accidental loss. It will be appreciated that when the screw 54 is turned into the threaded opening 54 in the bracket 42, the two parts of the housing will be held together.

A bulb retainer 62, forming an important novel element in this invention, is secured within the top portion of the housing and comprises a single sheet metal stamping. The bulb retainer comprises a side wall 64 having a rectangular aperture 66 therein. A split base comprising a pair of feet 68 extends at right angles from the wall 64 and includes confronting generally semicircular recesses 70 adapted to lie on opposite sides of a projecting neck 72 on the inside of the front body portion 16 of the housing 12 encircling the bulb receiving bore 74 therein. A central recess 76 between the feet 68 serves to key the base in proper position about the projecting neck 72. The upper foot is provided with a pair of spaced apertures 78, and the lower foot is provided with a single similar aperture 78, and screws 80 are passed through these three apertures and threaded into the front body portion 16 to anchor the bulb retainer in place.

The bulb retainer is narrowed by scallops 82, and a plate 84 extends at right angles from the wall 64 in the same direction as the feet 68, and substantially in parallelism therewith. The plate 84 is provided with a central aperture 86 having a helical impression 88 about the edge thereof for threadedly receiving a test bulb 90. The test bulb comprises an ordinary flash light bulb of the type nominally rated at 2.2 volts, and is of the generally flat type.

At the opposite edge of the plate 84 there is provided a side wall 92. The side wall 92 projects in the same direction as the side wall 64 from the plate 84, and is generally parallel to the plate 64, but converges slightly therewith. The junction between the plate 84 and side wall 92 is provided with an elongated aperture or slot 94 to promote flexibility of the side wall 92 relative to the plate 84. The side wall 92 is provided with a rectangular opening 96 transversely aligned with the opening 66, but of slightly lesser height than the opening 66.

The side wall 92 narrows or tapers as at 98 to a latch finger or tongue 100. The latch finger or tongue is provided with a central portion located relatively nearer to the side wall 64 than is the remainder of the latch finger or tongue. The central portion is joined to the tapered portion 98 by an outwardly directed portion, and there is further provided an outwardly directed tip 102. The central portion of the latch finger or tongue 100 is provided with a retaining section such as a rectangular aperture 104 for bayonet base bulbs. A flange or the like would be provided for sub-miniature bulbs.

A rectangular release member 106, preferably made of insulating material such as plastic, projects across the retainer 62. The release 106 is provided with a central body portion 108 received within the aperture or opening 66, but too large to fit within the aperture or opening 96. Projecting beyond the side wall 64 of the retainer and outwardly of the housing 12 through a rectangular aperture 110 formed in the front body portion 16, there is provided a release button 112 integral with the central body 108 and engageable by the thumb or finger of the photographer for laterally moving the release 106 (to the left in Fig. 3, and down in Fig. 4). At the opposite end of the body 108 there is an integral projection 114 which extends through the opening 96, and also through an opening 116 in the front body portion 16 of the housing 12. The body 108 is provided with a central opening 118 extending part way into the push button 112 for conserving material, for simple molding, and for light weight of the finished product.

An elongated flexible contact strap 120 is secured at its upper end to the lower front corner of the wall 64 of the retainer as at 122 by means such as a rivet. The strap 120 is provided near its mid section with a transverse crimp 123 to promote flexibility at that point, and further is provided toward the upper end from the crimp 123 with an additional crimp 124 facilitating installation of the top end of the strap against the inner surface of the side wall 64. The two crimps also provide a central body portion 126 which is held flat against the inside wall of the front body portion 16 of the housing 12. The lower portion or tail 128 of the flexible contact strap 120 tends to extend generally diagonally in toward the center of the housing, and is provided with an aperture 130 through which the stud 36 projects. A C-washer 132 fits in a slot in the stud 36 and abuts the contact strap 120, a fiber washer 134 being provided to the left (Fig. 3) of the C-washer positively to insure insulation from the adjacent dry battery 34. The tendency of the tail 128 of the strap to extend diagonally into the housing tends to retract the stud 36, thereby facilitating ready removal of the flash unit from the side of the camera, but the flexibility of the strap allows it to be moved toward the side of the flash unit housing when the stud is threaded into the complementary contact of the camera. It will be apparent that the flexible contact strap 120 forms an electrical connection between the bulb retainer and the stud 36.

A generally L-shaped positive contact 136 is secured to the center of the flange 44 of the Z-shaped bracket 42 by means such as a rivet 138, a slot being provided in the adjacent portion of the front body portion 16 to provide the necessary clearance. The contact 136 includes a generally horizontally extending section 140 having a down-turned tip 142 for aid in positioning the top end of one of the dry batteries 34. The section 140 is provided with a hole 144 for making the best possible contact with the cap on the top of the adjacent battery 34.

Above the connection of the L-shaped contact to the Z-shaped bracket 42 there is provided an offset 146 promoting flexibility of the upper portion 148. The upper portion 148 projects beyond the bulb base accommodating bore 74 and tends to extend forwardly, such tendency being resisted by engagement with the rearwardly projecting neck 72 on the inside of the housing. Substantially in central alignment with the bore 74 the upper portion 148 is provided with a transverse crimp 150 for engagement with the center or positive contact on the bottom of the bulb base as is illustrated at 152.

The flash unit is completed by an upstanding test contact 154, which is shown as a separate part, but which could be integral with the contact 136. The test contact 154 has a lateral flange 156 riveted or otherwise secured on top of the web 48 of the Z-shaped bracket 42. The test contact 154 is provided with a flat, substantially vertical upper portion 158 engageable by the positive contact of the bulb 90 held by the helical impression 88 around the opening 86 in the plate 84 of the bulb retainer 62.

In order to use the flash unit, the batteries 34 being installed in the position shown, the flash unit simply is positioned against the side of the camera, and the threaded tip 40 of the stud 36 is screwed into the corresponding contact on the side of the camera, the reduced tip 24 of the pin 22 at the same time being received in a complementary contact on the side of the camera. A flash bulb 160 of the standard miniature type having a bayonet base is pushed through the bore 74, one of the bayonet pins 162 (Fig. 4) being received in a slot or groove 164 formed in the housing, and the opposite pin 162 camming past the outwardly deflected tip 102 of the retainer, and being received in the rectangular aperture 104. The positive contact 152 on the base of the bulb engages the transverse crimp 150 of the positive contact, and bends the upward portion 148 of the contact rearwardly, thereby applying tension thereon. After an exposure has been made, and it is desired to release or eject the bulb 160, the push button 112 is engaged by the finger or thumb, and the release 106 is shifted laterally (to the left in Fig. 3, and down in Fig. 4). This deflects the latch finger or tongue 100 away from the base of the flash bulb 160, thereby releasing the bayonet pin 162. The upper portion 148 of the positive contact 136, being under tension, thereby ejects the bulb from the flash unit.

When it is desired to ascertain the potency of the batteries 34, all that is necessary is to short circuit the contacts 24 and 40 (no flash bulb having been installed in the flash unit). The flash light or test bulb or lamp 90 thus lights up, and the brilliance with which it lights may be used to judge the potency of the dry batteries.

The test bulb is left in place when it is desired to use the flash unit for taking a photograph. The flash bulb is simply inserted in the flash unit, as set forth in the penultimate paragraph above, and is electrically connected in parallel with the test bulb. Upon closing of the flash contacts in the camera shutter, the circuit is completed to ignite the flash bulb. Some current necessarily passes through the test bulb when a flash bulb is fired, but the resistance of the flash bulb is enough lower than that of the test bulb that the test bulb current is relatively negligible and has no effect upon firing of the flash bulb.

It will be apparent at this time that the flash unit herein shown and described is of rather simple and economical construction. Most particularly, the one piece bulb retainer which serves both to retain a flash bulb, and to mount a test bulb, lamp, or light is of a one piece construction which holds down material costs, and which reduces the manual effort necessary in fabrication of parts and assembly thereof to a minimum. The flexible contact strap 120 forms a subassembly with the bulb retainer, and the various positive contact parts including the bracket 42 and parts attached thereto form a subassembly. Such subassemblies materially reduce assembly time and expense.

The specific example of the invention as herein shown and described will be understood as being for exemplary purposes only. Various changes in structure will no doubt occur to those skilled in the art, and will be understood as forming a part of the invention insofar as they fall within the spirit and scope of the appended claims.

The invention is hereby claimed as follows:

1. In a flash unit, the combination comprising a bulb retainer having a section receiving the base of a test bulb and further having an integral portion releasably receiving the base of a flash bulb and including a latch device for holding a flash bulb in flashing position, means for moving said portion to effect release of a flash bulb from the latch device, said bulb retainer being of electrically conductive material and forming a contact of one polarity with said test bulb and with said flash bulb, a flash bulb contact of opposite polarity positioned adjacent said portion and engageable with a contact of a flash bulb, and a bulb contact of said opposite polarity positioned adjacent said section and engageable with a contact of a test bulb, said bulb contacts of said opposite polarity being at least electrically unitary.

2. In a flash unit, the combination comprising a bulb retainer having a plate with a hole therein receiving the base of a test bulb and further having an integral flexible member engageable with the side of a flash bulb base and movable relative to the retainer to latchingly interfit with a flash bulb base to hold the bulb in flashing position, said bulb retainer being of electrically conductive material and forming a contact of one polarity with said test bulb and said flash bulb, a flash bulb contact of opposite polarity positioned adjacent said integral member and engageable with a contact of said flash bulb, a bulb contact of said opposite polarity positioned adjacent said plate and engageable with a contact of said test bulb, and means forming an electrical connection to said bulb retainer.

3. In a flash unit, the combination comprising a housing, a bulb retainer within said housing and having a base portion attached to said housing and a side wall projecting substantially at right angles from said base, said bulb retainer further having a second side wall spaced from the first mentioned side wall in substantial parallelism therewith and integrally joined thereto by a connecting portion along corresponding edges of said side walls, said connecting portion having means thereon for receiving a test bulb, and said second side wall having means thereon engageable with the base of a flash bulb, said bulb retainer being of electrically conductive material and forming a contact of one polarity with said test bulb and said flash bulb, a flash bulb contact of opposite polarity positioned adjacent said retainer base engageable means and engageable with a contact of a flash bulb, and a bulb contact of said opposite polarity positioned adjacent said connecting portion and engageable with a contact of said test bulb, said bulb contacts of said opposite polarity being at least electrically unitary.

4. The combination as set forth in claim 3 wherein the connecting portion comprises a plate having an opening therein for receiving said test bulb, and the bulb engaging portion of said second side wall is formed to be complementary to a part of a flash bulb base to latch the flash bulb in flashing position.

5. The combination as set forth in claim 4 wherein the juncture of the plate and the second side wall is provided with an opening promoting flexibility of the second side wall, and further including a release member extending through openings in the housing and first side wall and engageable with the second side wall, manual pressure on said release member effecting flexing of the second side wall to release a flash bulb.

6. A bulb retainer comprising a one piece sheet metal structure having a base adapted for mounting on a support, a first side wall extending substantially at right angles to said base, a plate at the opposite edge of said side wall extending substantially parallel to said base and having means thereon for receiving a test bulb, and a second side wall on the opposite edge of said plate extending in substantial parallelism with the first side wall and in the same direction, said second side wall being movable relative to the first side wall and having means thereon engageable with base of a flash bulb.

7. A bulb retainer comprising an integral, one piece sheet metal structure having a base adapted for attachment to a supporting structure, a side wall extending from one edge of said base and substantially at right angles thereto, a plate on the opposite edge of said side wall and substantially parallel to said base, said plate having an aperture therein and having a helical impression encircling said aperture for receipt of a test bulb, a second side wall on the opposite edge of said plate and extending substantially in parallelism with the first side wall and in the same direction thereas, said second side wall having a latching portion at the tip thereof provided with an aperture adapted to receive the transversely extending bayonet pin on a flash bulb base.

8. A flash bulb retainer comprising a one piece, integral sheet metal structure including a base adapted for attachment to a supporting structure, said base having an opening therein, a side wall projecting substantially at right angles to said base from one edge thereof and provided with an opening for passage of a release member, a plate at the opposite edge of said side wall and extending substantially parallel to said base and in the same direction as said base, said plate having an opening therein with an encircling helical impression for receipt of a test bulb, a second side wall joined to said plate at the opposite edge thereof and extending generally in the same direction and in parallelism with the first side wall, there being an opening formed in juncture between the plate and the second side wall to promote flexing of the second side wall, and a retaining tip on said second side wall projecting into the opening in the base, said retaining tip having an aperture therein adapted to receive the transverse pin of a flash bulb base.

References Cited in the file of this patent

UNITED STATES PATENTS

| | | |
|---|---|---|
| 2,329,011 | Steiner | Sept. 7, 1943 |
| 2,496,680 | Schwartz | Feb. 7, 1950 |